Aug. 9, 1966     A. F. A. BARTELS     3,264,681
METHOD OF OPENING UP THE BELLY CAVITY OF UNSLAUGHTERED FISH
Filed Feb. 17, 1965     2 Sheets-Sheet 1
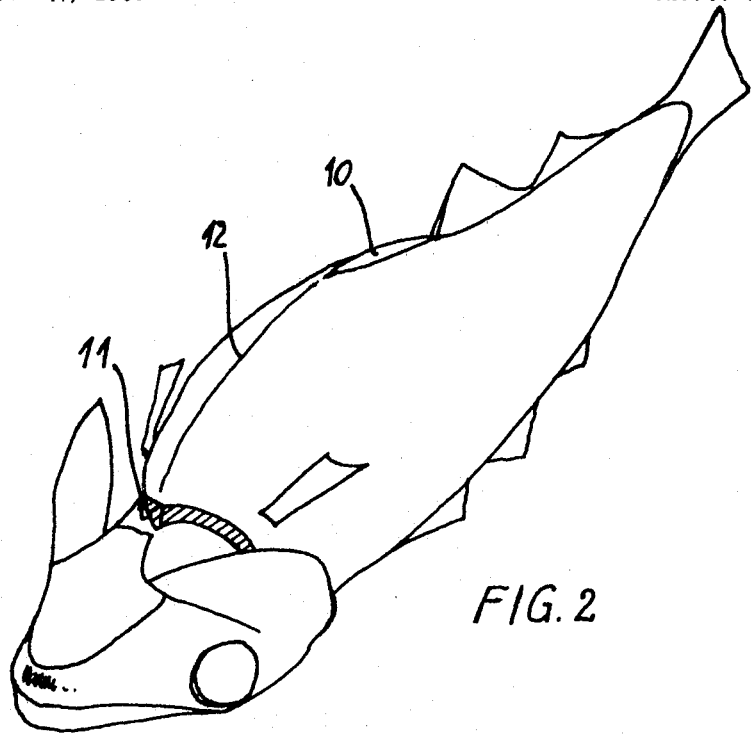
FIG. 2
FIG. 1
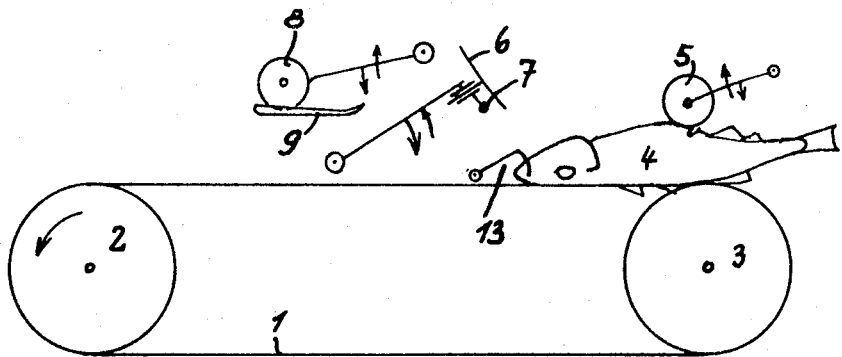
INVENTOR:
A. F. A. Bartels
BY
Richards & Geier
ATTORNEYS Aug. 9, 1966   A. F. A. BARTELS   3,264,681
METHOD OF OPENING UP THE BELLY CAVITY OF UNSLAUGHTERED FISH
Filed Feb. 17, 1965   2 Sheets-Sheet 2

INVENTOR:
A. F. A. Bartels
BY
Richards & Geier
ATTORNEYS

United States Patent Office 3,264,681
Patented August 9, 1966

3,264,681
METHOD OF OPENING UP THE BELLY CAVITY OF UNSLAUGHTERED FISH
Alfred Friedrich Adolf Bartels, Lubeck-Israelsdorf, Germany, assignor to Nordischer Maschinenbau Rud, Baader, Lubeck, Germany, a firm
Filed Feb. 17, 1965, Ser. No. 433,373
Claims priority, application Germany, Feb. 20, 1964, N 24,480
5 Claims. (Cl. 17—45)

The invention relates to a method for opening up the belly cavity of unslaughtered fish which can be carried out as first stage of the slaughtering. The object is to expose the contents of the belly cavity so that the liver and guts are damaged as little as possible but freely accessible for removal.

Hitherto the opening up of the belly cavity has been carried out by hand on board ship so as to allow the fish to bleed as soon as possible after they are caught. It has already been proposed to cut the fish gripped behind the gill flap by means of a circular knife entering the throat in the symmetry plane of the fish, controlled in three movements and emerging from the fish on reaching the anus.

The accurate position of the cut in the symmetrical middle of the throat is essential for various dressing operations to be carried out subsequently and especially for processing to clip fish, because the fish becomes second grade even in the case of only slightly laterally deviating cut. The places where sinews and cartilaginous portions join make an accurate incision particularly difficult.

It has now been found that it is possible to open up the belly cavity absolutely accurately if a short incision is made in the belly cavity in the vicinity of the anus, the isthmus is then severed and finally the belly cavity slit open along its entire length between the anus and the collar bones, the belly cavity being thereby supported and centrally guided in the interior with the aid of the contacting ends of the collar bones. By controlling the cut with the aid of the collar bone ends also in the region of the throat, an absolutely accurate opening up of the belly cavity is ensured. To effect this opening cut, a guide is preferably used which is shaped like a spike or stylus, which penetrates the belly cavity, and serves at the same time as counter-bearing for the slitting tool and is centered between the ends of the collar bones.

The method according to the invention enables the opening up of the belly cavity to be carried out in a perfect manner of all fish with belly cavity extending towards the rear beyond the anus, such as cod, sea-salmon and the like, that is the so-called "gadoid" fish. In the case of fish, the belly cavity of which terminates at the anus, such as red mullet and the like, the incision in the vicinity of the anus can be dispensed with, because the stylus-shaped guide can also pass out through the anus. This, however, can only take place when the fish is fed head first so that the stylus-shaped guide can be introduced from the gill cavity between the ends of the collar bones.

However, the entire method can be applied just as reliably if the unslaughtered fish is gripped by the tail and carried tail first past the cutting tools which effect the incision at the anus, the parting of the isthmus and the opening up of the belly cavity, whereby the stylus-shaped guide serving as counter-bearing for the slitting knife is introduced through the incision at the anus. The guide then slides from the anus just below the belly cover and is accurately guided between the abutting ends of the collar bones.

The times for introducing and removing the slitting knife, the throat knife and the stylus can, if necessary, be determined in known manner by the dimensions of the fish (length and width) by measuring.

The severance of the isthmus is preferably carried out in such a manner that the skin and gullet are cut through between the last curve of the gills and the ends of the collar bones.

To enable the method to be more readily understood, it is illustrated in the accompanying drawings applied to a fish fed head first, which is gripped by clamps in known manner, for example, in the eye sockets or by the lower jaw. In the drawings FIG. 1 shows diagrammatically a machine with the necessary tools suitable for carrying out the method;

FIG. 2 is a perspective view of a fish resting on its back;

Figure 3:
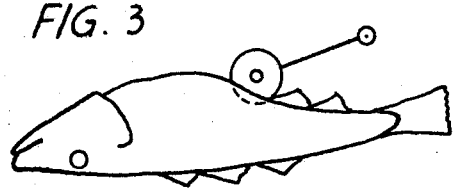
FIG. 3 shows a fish at the moment of the incision at the anus.
Figure 4:
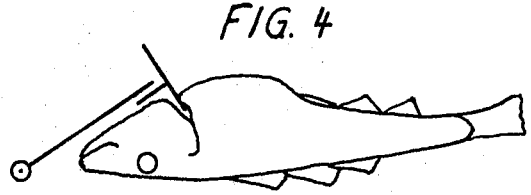
FIG. 4 shows the commencement of the cut for severing the isthmus.
Figure 5:
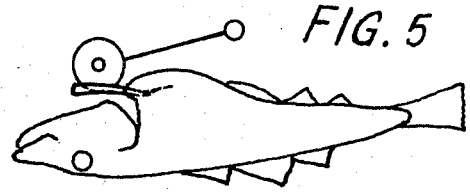
FIG. 5 shows the penetration of the stylus for the opening cut.
Figure 6:
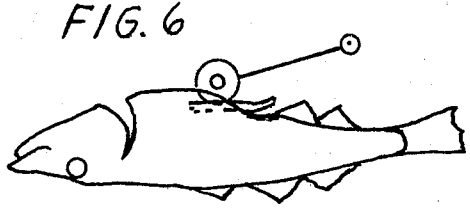
FIG. 6 shows the passing out of the stylus at the end of the opening cut.

According to FIG. 1, a chain conveyor is guided and driven at 2 and 3 and carries an entraining element 13 constructed as a head clamp which grips the fish which has been introduced, conveys it past the tools and releases it at 2. A fish 4 lying on its back is under the tool 5, the circular knife of which is about to enter the body of the fish in the vicinity of the anus (FIG. 3), there making an incision. A circular knife 6 arranged transversely to the path of travel of the fish is swung out above the path of travel of the fish and descends into the fish just behind the head clamp (FIG. 4), spreads the gill flaps by means of the bow 7 and then severs the isthmus. If desired, the gill skin stretched between the last gill curve and the collar bones and the throat can also be cut through. Following the circular knife 6 another circular knife 8 is arranged which descends into the slot in a spike or stylus 9 which penetrates the belly cavity of the fish through the gill cavity (FIG. 5). This spike or stylus bears against the wall of the belly cavity and is guided by the inner edges of the collar bones (Calviculae) so that the throat is severed exactly in the middle and, after splitting open the belly cavity, passes out at the incision made in the vicinity of the anus (FIG. 6).

FIG. 2 shows the fish resting on its back with the incision 10 cut in the vicinity of the anus and the severed isthmus 11. The opening line between the incision 10 and the isthmus 11 is designated by 12.

What I claim is:
1. Method of opening up the belly cavity of unslaughtered fish, comprising the steps of providing a short incision in the belly cavity in the vicinity of the anus, severing the isthmus and then slitting open the belly cavity along its entire length between the anus and the ends of the collar bones by a slitting tool, and guiding the fish to the slitting tool whereby the belly cavity is supported and centrally guided to the slitting tool.

2. Method according to claim 1, wherein for effecting the opening up slit a guide in the form of a stylus is used which penetrates the belly cavity and serves at the same time as counter-bearing for the slitting tool and is guided and centered between the ends of the collar bones.

3. Method according to claim 2, wherein the stylus-shaped guide serving as counter-bearing for the slitting tool is introduced through the gill cavity between the ends of the collar bones.

4. Method according to claim 2, wherein the stylus-shaped guide serving as counter-bearing for the slitting tool is introduced through the short incision in the vicinity of the anus.

5. Method according to claim 1, also consisting in that when severing the isthmus, the skin between the last gill curve and the ends of the collar bones and also the gullet are cut through.

References Cited by the Examiner
UNITED STATES PATENTS

| | | | |
|---|---|---|---|
| 2,917,772 | 12/1959 | Schlichting | 17—2 |
| 3,003,186 | 10/1961 | Erikson | 17—3 |

FOREIGN PATENTS

| | | |
|---|---|---|
| 98,679 | 9/1961 | Norway. |

SAMUEL KOREN, *Primary Examiner.*

LUCIE H. LAUDENSLAGER, *Examiner.*